A. E. LEYMARIE.
SHOCK ABSORBER FOR VEHICLES.
APPLICATION FILED MAR. 28, 1913.
1,207,775.
Patented Dec. 12, 1916.
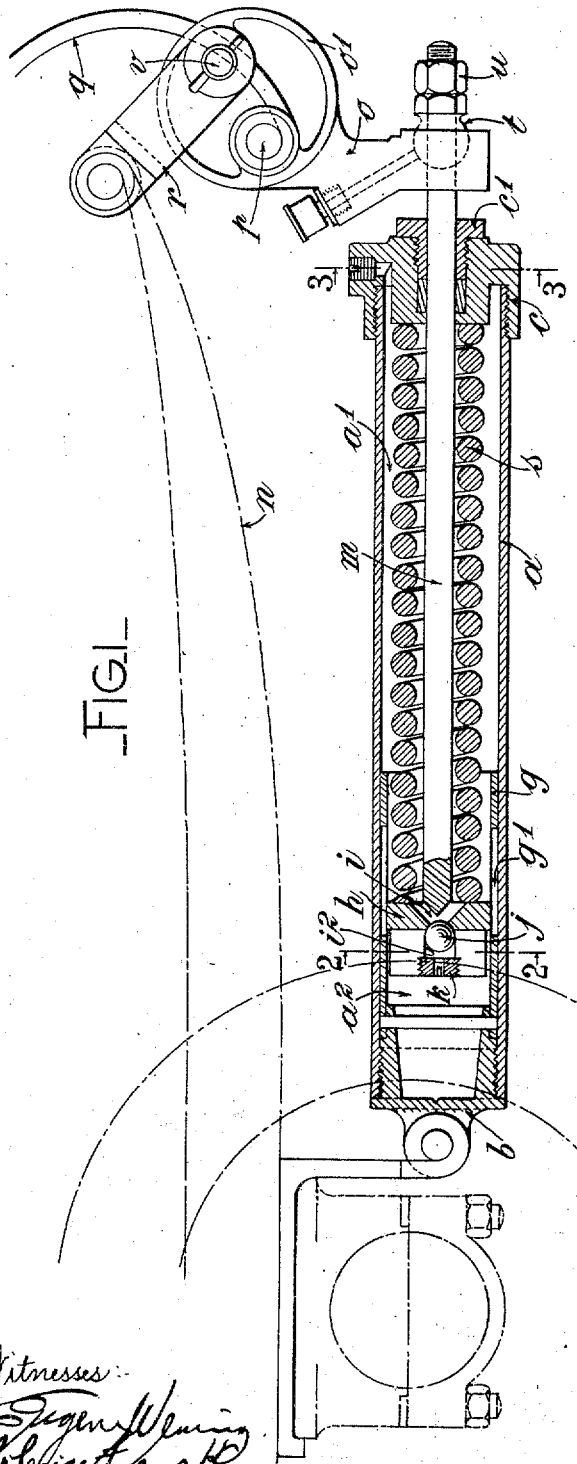
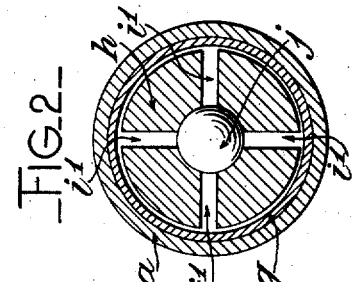
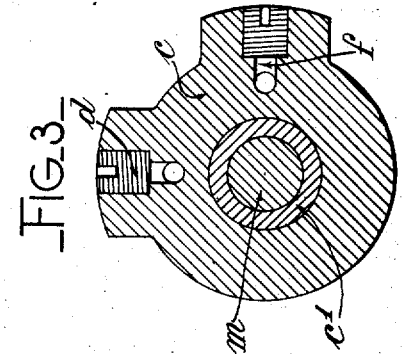
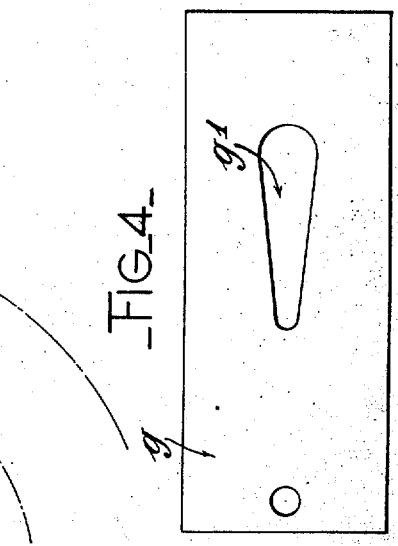
Inventor
Antoine Edmond Leymarie

UNITED STATES PATENT OFFICE.

ANTOINE EDMOND LEYMARIE, OF PARIS, FRANCE.

SHOCK-ABSORBER FOR VEHICLES.

1,207,775.   Specification of Letters Patent.   Patented Dec. 12, 1916.

Application filed March 28, 1913. Serial No. 757,287.

*To all whom it may concern:*

Be it known that I, ANTOINE EDMOND LEYMARIE, citizen of the Republic of France, residing at 60 Boulevard de Clichy, Paris, France, have invented new and useful Improvements in Shock-Absorbers for Vehicles, of which the following is a specification.

This invention relates to improvements in shock absorbing devices for motor cars or other vehicles and refers more particularly to a shock absorber designed to be used to complete the action of the ordinary suspension springs for absorbing the small vibrations as well as the sudden jerks imparted to the vehicle by the surface of the road.

In the accompanying drawing, given by way of example: Figure 1 is a longitudinal section of the improved shock absorber, Figs. 2 and 3 are cross sections along the lines 2—2 and 3—3, Fig. 1, respectively. Fig. 4 is a view of the sleeve.

The shock absorber shown comprises a tube $a$ entirely filled with oil and provided at one end with a cap $b$ provided with lugs by which the end of the tube is pivotally mounted for instance on any suitable part secured to the axle box. At the opposite end, the tube $a$ is closed by a nut $c$ provided with a stuffing box $c^1$. The nut $c$ has two holes $d$, $f$ (Fig. 3) normally closed by plugs. The hole $f$ is used for filling the tube with oil and the hole $d$ serves for the escape of air.

In the left end (Fig. 1) of the tube $a$, is fixed a sleeve $g$ provided with two or more longitudinal slots or openings $g^1$ (Fig. 4) having a width which gradually decreases toward the cap $b$. In the sleeve $g$ is mounted a sliding piston $h$ provided with inclined holes $i$ which open into a longitudinal cylindrical passage $i^2$ which is in communication with four radial slots $i^1$ opening into the outer periphery of the piston. The oil in the right hand chamber $a^1$ of the tube $a$ can thus pass into the left chamber $a^2$. The oil is prevented from returning from the chamber $a^2$ into the chamber $a^1$, through the slots $i^1$, passage $i^2$ and holes $i$, by means of a ball valve $j$ which closes the ends of the holes $i$ when the piston moves toward the left (Fig. 1), the movement of said ball valve being limited by a threaded plug $k$ screwed into the passage $i^2$.

The piston $h$ is provided with a piston rod $m$ extending through the stuffing box $c^1$ and connected at its end to a bell crank lever $o$ $o^1$. The bell crank lever $o$ $o^1$ is formed of an upwardly extending arm $o$ integral with two annular side plates $o^1$ provided with two diametrically opposite bosses in which bolts or pivots $p$ $v$ are pivoted. Said side plates form the shorter arm of the bell crank lever, the longer arm of which is formed by the arm $o$. The end of the spring or spring carrier $q$ is pivotally secured to the bolt $p$ and the bolt $v$ is connected by means of two links or shackles $r$ to the adjacent end of the main leaf spring $n$ of the vehicle. The free end of the lever arm $o$ is provided with a ball socket in which a ball $t$ is adapted to bear. Said ball $t$ is provided with an axial hole internally threaded and screwed on the threaded end of the piston rod $m$. A lock nut $u$ on said rod holds the ball or nut $t$ in position on the rod. Around the piston rod $m$, is arranged a coiled spring $s$ which acts to press the piston $h$ toward the left, Fig. 1.

The vehicle being at rest, the coiled spring $s$ acts to balance the load carried by the end of the main leaf spring $n$ of the vehicle and any displacement downwardly of the vehicle body with respect to the wheel, for instance if the wheel runs against an obstacle causes the piston $h$ to be moved from the left to the right in Fig. 1. This movement is checked by the spring $s$ which is thereby compressed and at the same time, the oil contained in the chamber $a^1$ of the tube $a$ pushes the valve $j$ against the stop $k$ and flows into the chamber $a^2$. When the piston $h$ is driven to the left by the reaction of the coiled spring $s$, the liquid in the chamber $a^2$, which has a tendency to flow into the chamber $a^1$ acts to force the valve $j$ against its seat so that the said liquid, under the pressure of the piston, is compelled to pass through the slots $g^1$ in the sleeve $g$ between the periphery of the piston and the inner surface of the tube $a$. As the piston comes nearer to its original position, the free section of the slots $g^1$ for the passage of the oil has a gradually decreasing width so that the exit of the liquid from the chamber $a^2$ is gradually smaller and the movement of the piston is gradually retarded. The car frame and the wheels are thus slowly and progressively restored to their original respective positions and the shocks imparted by the road are thus considerably deadened.

The invention is obviously not restricted to the details shown and described and it may be modified within the scope of the appended claims without departing from the spirit of the invention.

Having now described my invention, what I claim as new and desire to secure by Letters Patent is:

1. A shock absorbing device, embodying therein a casing adapted to contain liquid, a piston slidable within said casing, said piston having a valve controlled axial duct for the passage of liquid from one side to the other of the piston, and a plurality of radial ducts of reduced diameter for return of the liquid to its source, said radial ducts being in communication with said axial duct, and means adapted to govern the rate of flow of the liquid through said ducts.

2. A shock absorbing device, embodying therein a casing adapted to contain liquid, a piston slidable within said casing and having a valve controlled axial duct for the passage of liquid from one side to the other of the piston and a plurality of radial ducts of reduced diameter for return of the liquid to its source, and a sleeve within said casing provided with orifices through which the liquid passes as it flows out of said radial ducts.

3. A shock absorbing device, embodying therein a casing adapted to contain a liquid, a spring controlled piston slidable within said casing, said piston having a valve controlled axial duct and a plurality of radial ducts each communicating at one of its ends with said axial duct, and a sleeve within said casing, said sleeve having orifices adapted to communicate with said radial ducts.

4. A shock absorbing device, embodying therein a casing adapted to contain a liquid, a piston slidable within said casing, a spring having a normal tendency to force said piston toward one end of said casing, said piston having a valve controlled axial duct and a plurality of radial ducts communicating with said axial duct, and a sleeve fixed to said casing and within which said piston slides, said sleeve having a plurality of slots therein gradually decreasing in size in a direction parallel to that toward which the piston is forced by said spring.

In testimony whereof I have signed my name to this specification in the presence of two subscribing witnesses.

ANTOINE EDMOND LEYMARIE.

Witnesses:
ANTOINE LAVOIX,
BARTLEY F. YOST.